United States Patent [19]
Ledger

[11] Patent Number: 5,555,474
[45] Date of Patent: Sep. 10, 1996

[54] AUTOMATIC REJECTION OF DIFFRACTION EFFECTS IN THIN FILM METROLOGY

[75] Inventor: Anthony M. Ledger, Newfairfield, Conn.

[73] Assignee: Integrated Process Equipment Corp., Phoenix, Ariz.

[21] Appl. No.: 360,535

[22] Filed: Dec. 21, 1994

[51] Int. Cl.$^6$ .............................................. G01B 11/06
[52] U.S. Cl. .......................................... 356/381; 356/382
[58] Field of Search .................................... 356/381, 382, 356/345, 355, 357, 359, 360, 369, 445, 446; 250/560, 561

[56] References Cited

U.S. PATENT DOCUMENTS

| | | | |
|---|---|---|---|
| 3,693,025 | 9/1972 | Brunton | 356/382 |
| 3,870,884 | 3/1975 | Williams . | |
| 5,291,269 | 3/1994 | Ledger | 356/355 |
| 5,293,214 | 3/1994 | Ledger | 356/355 |
| 5,333,049 | 7/1994 | Ledger | 356/355 |
| 5,436,725 | 7/1995 | Ledger | 356/381 |
| 5,452,953 | 9/1995 | Ledger | 356/382 |

FOREIGN PATENT DOCUMENTS

| | | | |
|---|---|---|---|
| 5099627 | 4/1993 | Japan | 356/382 |
| 5149720 | 6/1993 | Japan | 356/382 |

Primary Examiner—Hoa Q. Pham
Attorney, Agent, or Firm—Cahill, Sutton & Thomas P.L.C.

[57] ABSTRACT

A layer thickness determination system (10) is employed for detecting a thickness of at least one layer (12a) disposed over a surface of a wafer (13) having one or more first regions characterized by circuit and other features, and one or more second regions characterized by an absence of circuit and other features. The system includes an optical system (14) having an optical axis (14a) for collecting light reflecting from the at least one layer and the surface of the wafer. The system further includes a camera (16) coupled to the optical system for obtaining an image from the collected light; a first light source (22) for illuminating the layer with light that is directed along the optical axis and within the cone of acceptance angles; and at least one second light source (18) for illuminating the layer with light that is directed off the optical axis and outside of the cone of acceptance angles. A data processor operates to generate an image mask that differentiates planar film regions from non-planar film regions, and, in one embodiment, further operates to detect a thickness of the at least one layer only within the planar film regions.

21 Claims, 12 Drawing Sheets

CONVENTIONAL COMPUTATION

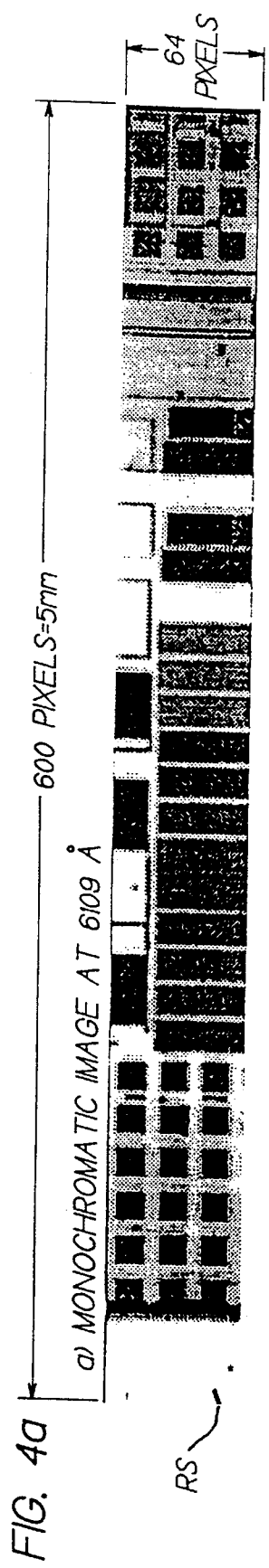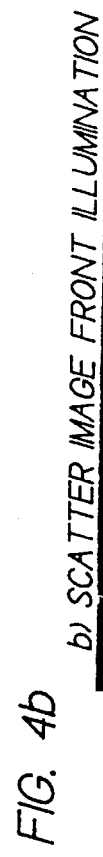
FIG. 4a  a) MONOCHROMATIC IMAGE AT 6109 Å  (64 PIXELS × 600 PIXELS = 5mm)
FIG. 4b  b) SCATTER IMAGE FRONT ILLUMINATION
FIG. 4c  c) SCATTER IMAGE RIGHT HAND SIDE ILLUMINATION

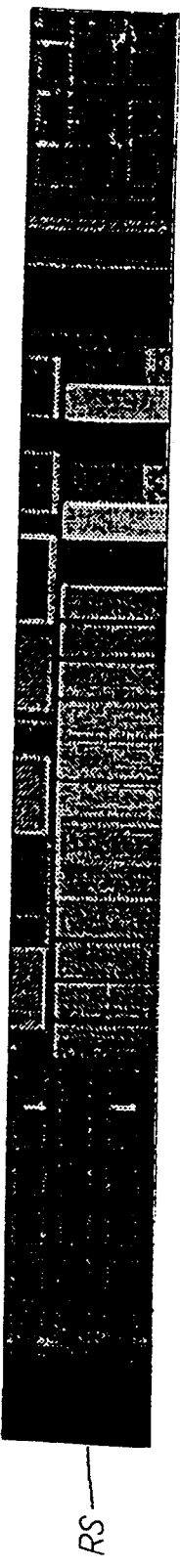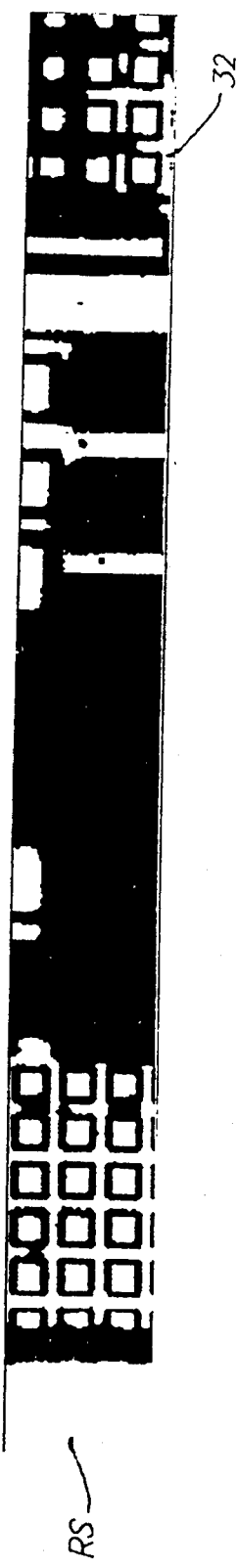
FIG. 4d  d) COMBINED SCATTER IMAGES
FIG. 4e  e) TWO STATE PATTERN DERIVED FROM THE COMBINED SCATTER IMAGES. NO THICKNESS IS COMPUTED WHERE THE MAP IS BLACK (STATE(0))

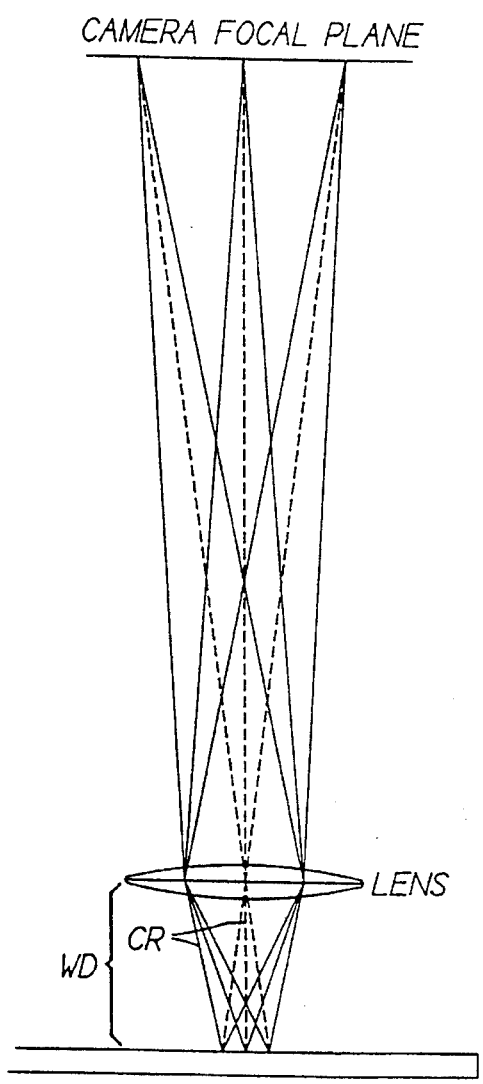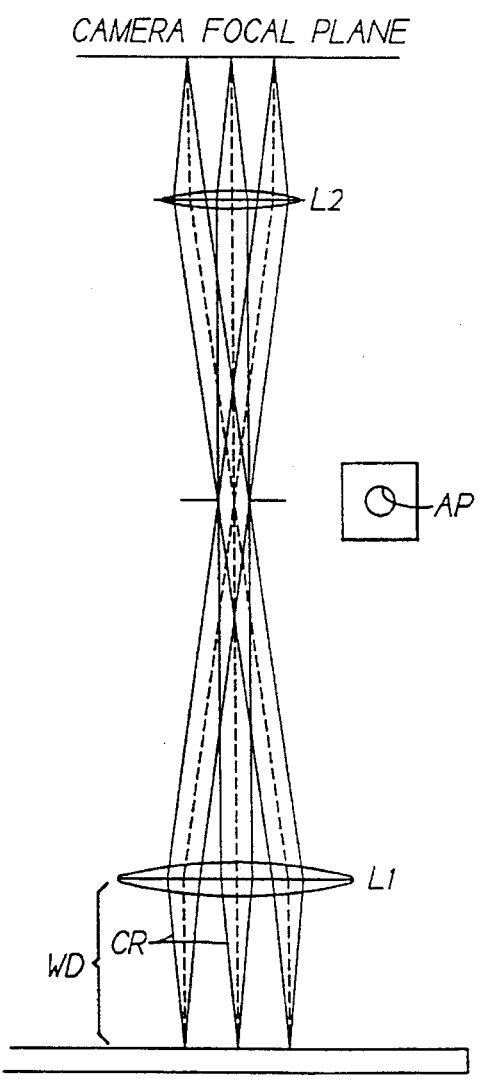
FIG. 10a
FIG. 10b

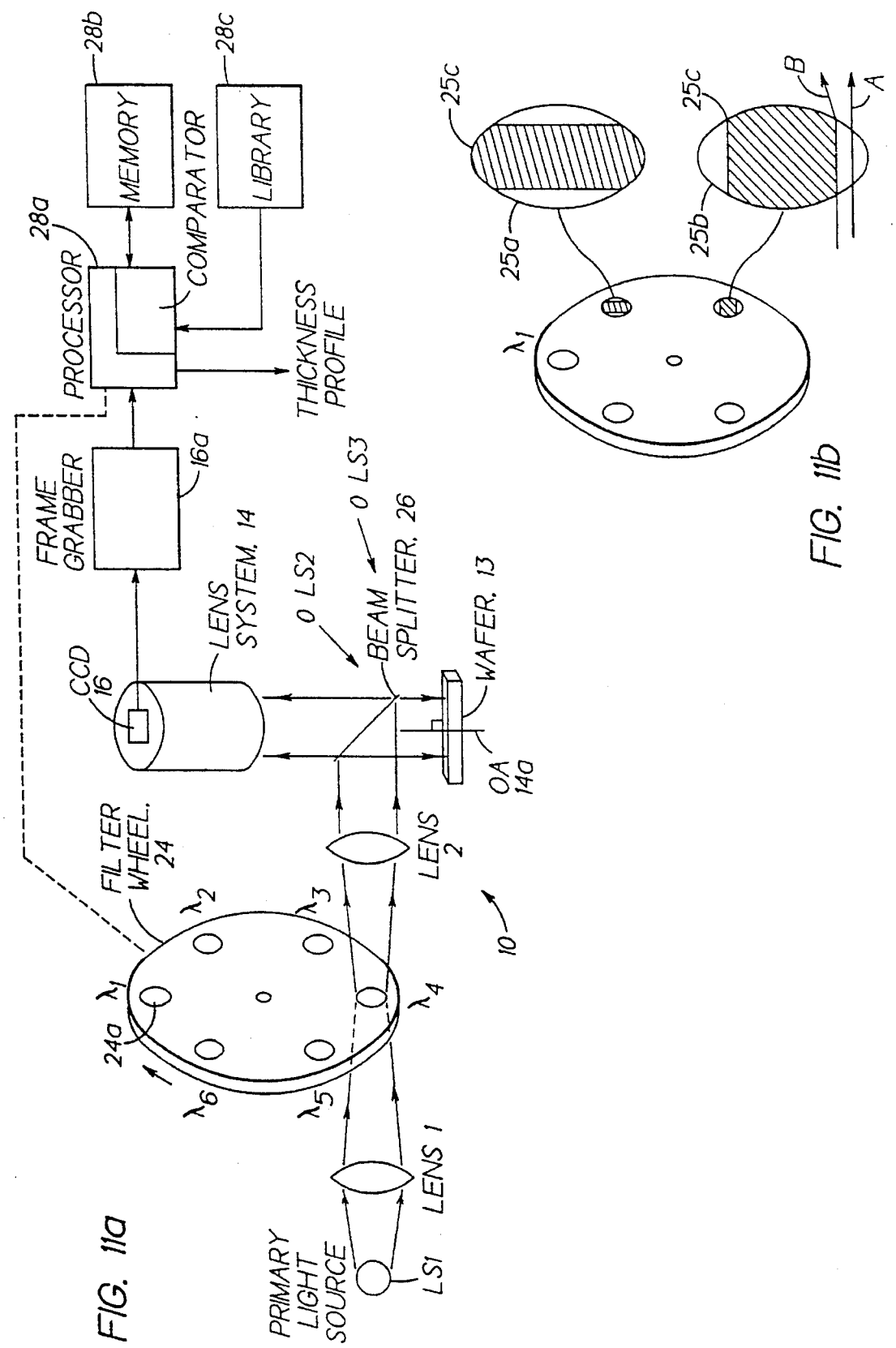

AUTOMATIC REJECTION OF DIFFRACTION EFFECTS IN THIN FILM METROLOGY

FIELD OF THE INVENTION:

This invention relates generally to optical metrology methods and apparatus and, in particular, this invention relates to methods and apparatus for measuring a thickness of one or more thin layers or films that are disposed upon or over a surface of a supporting substrate.

BACKGROUND OF THE INVENTION

In commonly assigned U.S. Pat. Nos. 5,291,269 (3/1/94), 5,293,214 (3/8/94) and 5,333,049 (7/26/94) the inventor discloses methods and apparatus for determining a thickness of a layer of material. For example, in the '049 patent the inventor discloses a full aperture measurement instrument for determining a thickness of a layer disposed on a substrate. The substrate may be a semiconductor wafer. A light source is used for illuminating a surface of the layer, and a CCD camera is employed for obtaining an image of the illuminated surface. The image obtained from the camera is converted into a map of measured reflectance data, which is subsequently compared to reference reflectance data. The result is the generation of a map describing a thickness profile of the layer.

Although the techniques described in these commonly assigned U.S. Patents are very well suited for their intended applications, a problem is created when the underlying surface of the wafer is patterned, as is typically the case when a semiconductor wafer is being processed to form integrated circuits. In this case the illumination that passes through the surface layer, which may be a layer of $SiO_2$ used as a Chemical-Mechanical Polishing (CMP) layer, is scattered and diffracted by the underlying circuit features. These features often take the form of short, repetitive linear structures which, due to their small size and close spacings, can function as wavelength selective diffraction gratings. The scattering and diffraction of the illumination results in a significant reduction in the amount of illumination that reaches the camera, often by as much as 30% to 50%, over the case where the underlying substrate or wafer is smooth and not patterned. Furthermore, the optical system for a full aperture thickness measurement system is typically incapable of resolving the micron and sub-micron sized circuit features. In addition, the patterning of the wafer surface varies widely over the surface, depending on what type of integrated circuit structures are being fabricated within a given area. As a result, it is very difficult to accurately model the optical behavior of the wafer/layer system, thus severely complicating the task of generating accurate reference reflectance data for use in comparing to an obtained image.

Presently available equipment that is used to measure film thicknesses on patterned wafers uses microscope objectives which view only one small region on the wafer. The presently available equipment has many other disadvantages. One disadvantage results from the use of a microscope which provides high magnification, but at the expense of a small f-number and correspondingly large light collection angle. The large light collection angle allows diffracted and scattered radiation to enter the optical system and to interfere with the specular reflection from the film layers being measured. It is extremely difficult or impossible to separate these two contributions, since they both are detected by the same optical detector.

A second disadvantage results from a requirement to locate the microscope objective at a precise point in the field so as to avoid diffracting areas. This requires the use of an accurate x-y wafer positioning stage, and further requires precise knowledge of the details of the spatial arrangement of the circuit features.

In addition, currently available systems do not utilize the benefits that accrue from image collection or image processing in order to enhance the measurement of thin layers or films.

The aforementioned CMP layer is typically applied so as to planarize the surface of the wafer as it is processed. As circuit features are incrementally formed during wafer processing the height of the surface of the wafer tends to vary widely. This variation in height over the wafer surface complicates the subsequent accurate placement of further circuit structures. Also, focussing becomes more difficult resulting in lower chip yields. To overcome these problems it is known to deposit a dielectric layer, such as a CV deposited layer of $SiO_2$, and to then chemically and mechanically polish the dielectric layer (i.e., the CMP layer), thus providing a smooth and uniform electrically insulating layer upon which to continue to form further circuit structures. In this case apertures are made through the CMP layer as required to contact already formed circuit features. In order to accurately planarize the CMP layer it is thus required to accurately know the thickness of the CMP layer, at a plurality of locations, so as not to remove too much of the CMP layer. If this were to occur the destruction of the underlying circuits could result. Even if the underlying circuits are not damaged; if the CMP layer is made too thin the dielectric characteristics of the CMP layer may be impaired, resulting in short circuits developing between circuit features located above and below the CMP layer.

It can be appreciated that a semiconductor wafer in an intermediate stage of processing can represent a very significant investment in both processing time and money. It can therefore further be appreciated that it is an important requirement to accurately determine the thickness profile of the CMP layer. It is also important to accurately determine the thickness profile of other types of intermediate layers that may be deposited on existing patterns for, by example, quality control and diagnosis purposes.

It is thus one object of this invention to accomplish the determination of the thickness profile of one or more layers or films in a rapid manner so as not to unduly impact the throughput of a semiconductor fabrication line. It is a further object of this invention to accomplish the determination of the thickness profile of one or more layers or films without requiring a priori knowledge of the types of underlying scattering and diffracting features, their geometry, or their locations (both spatial and/or angular), and to also not require the use of precise positioning tables and the like.

SUMMARY OF THE INVENTION

The foregoing and other problems are overcome and the objects of the invention are realized by a method of optically cataloging the surface of a patterned wafer into regions having different optical scatter properties, so that errors in the computation of thickness or optical constant maps can be reduced. A first level of screening separates purely planar film system regions from those containing scattering and diffracting features. Further differentiation between different planar film designs at different places on the wafer is accomplished by using different numerical spectral libraries, and a subsequent determination of which spectral library provides a best fit (lowest merit function) over a given area. Typically the measurements are made with prior knowledge of the type of film systems to expect, but not necessarily where individual areas are located or how they are aligned.

Differentiating between areas which have different diffractive and scattering signatures (different circuit patterns, line directions, etc.) may be accomplished using multiple libraries which include a coherent coupling between the film surfaces and the diffracting and scattering structures. In this case library computation requires knowledge of the circuit spatial details and their orientation, as well as the optical properties (e.g., index of refraction at various wavelengths) of the materials.

The teaching of this invention enables the measurement process for planar layers to occur in a rapid manner, and does not require that the wafer be precisely positioned under the optical measurement system.

The teaching of this invention employs a high resolution, narrow field of view multispectral full aperture imaging system which incorporates an automatic system for determining which regions on a wafer contain planar areas and which regions contain scattering and diffracting regions. By example, two white light images, taken with oblique illumination in orthogonal directions, are used to create a binary image mask which is used to prevent thickness computations from being carried out in areas which contain circuit features of any type (e.g., edges, rectangles, sub-micron features, die edge lines, etc.). This technique speeds the measurement process and significantly reduces the number of erroneous values resulting from scattering, diffraction, and defects, since these areas are automatically avoided.

A layer thickness determination system in accordance with this invention is employed for detecting a thickness of at least one layer disposed over a surface of a wafer having one or more first regions characterized by circuit and other features, and one or more second regions characterized by an absence of circuit and other features. The system includes an optical system for collecting light reflecting from the at least one layer and the surface of the wafer. The optical system is preferably a telecentric optical system, and has an optical axis and a narrow cone of acceptance angles disposed about the optical axis. The system further includes a camera coupled to the optical system for obtaining an image from the collected light; a first light source, which includes filters, for illuminating the layer with substantially monochromatic light that is directed along the optical axis and within the cone of acceptance angles; and at least one second light source for illuminating the layer with light that is directed off the optical axis and outside of the cone of acceptance angles. A data processor has an input coupled to an output of the camera for obtaining from the camera first pixel data corresponding to at least one first image obtained with light from the first light source and for obtaining second pixel data corresponding to at least one second image obtained with light from the at least one second light source. The data processor operates to generate an image mask from the second pixel data for distinguishing the first wafer regions from the second wafer regions, and further operates to detect a thickness of the at least one layer within the second regions in accordance with the first pixel data and in accordance with predetermined reference pixel data.

The first multispectral light source provides illumination with a first incidence angle on the layer, the first incidence angle being an angle that causes specularly reflected light to enter the cone of acceptance angles of the optical system.

The second light source (which may a part of the first light source) provides illumination with a second incidence angle on the layer, the second incidence angle being an angle that causes specularly reflected light to not enter the cone of acceptance angles of the optical system.

BRIEF DESCRIPTION OF THE DRAWINGS

The above set forth and other features of the invention are made more apparent in the ensuing Detailed Description of the Invention when read in conjunction with the attached Drawings, wherein:

FIGS. 4a–4e depict images of a patterned substrate having a film layer, and illustrate a method for deriving a mask to select areas that avoid scattering and diffracting patterns;

FIG. 6a is a histogram corresponding to the unmasked thickness map of FIG. 5a;

FIG. 8a is a merit function map corresponding to the unmasked thickness map of FIG. 5a;

FIG. 10a is diagram of a conventional imaging system;

FIG. 10b is a diagram of a telecentric optical system that is a presently preferred embodiment of an imaging system for use with this invention;

FIG. 11a is a block diagram of a thickness determination system in accordance with a first embodiment of this invention; and FIG. 11b illustrates a filter wheel for use in a second embodiment of this invention.

DETAILED DESCRIPTION OF THE INVENTION

Figure 1:
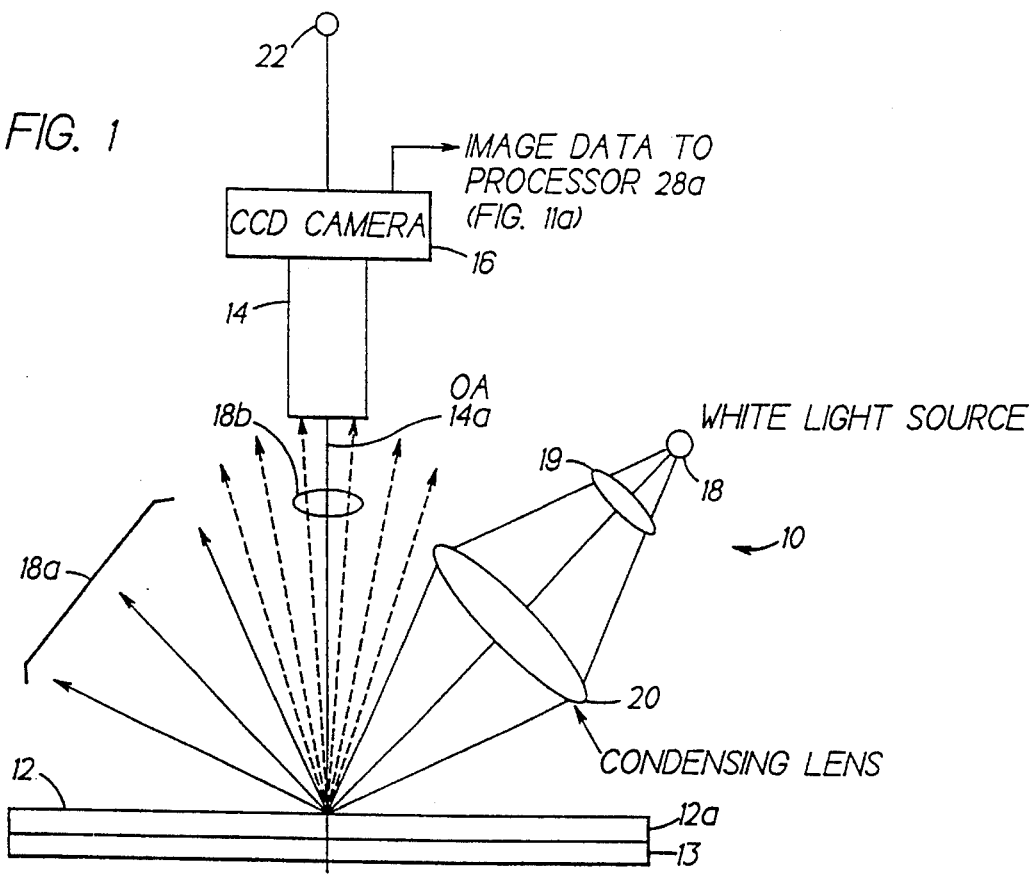
FIG. 1 is a simplified block diagram illustrating a film thickness measurement system in accordance with this invention.

It is first noted that the teaching of this invention is applicable in general to any structured optical pattern, whether it be, by example, a patterned wafer, a liquid crystal display, or a biological sample. As such, and although the invention is described herein in the context of a semiconductor wafer fabrication application, the teaching of this invention is not to be construed to be limited in scope to only the determination of a film thickness upon a semiconductor wafer. The terms "film" and "layer" are used interchangeably herein, and are both intended to encompass a region comprised of a first material (e.g., $SiO_2$) that is disposed upon or over a second material (e.g., Si), wherein the first material has at least one optical characteristic (e.g., index of refraction) that is different than that of the second material.

Patterned wafers at first glance contain a bewildering number of features, patterns and sub-patterns having dimensions that range in size from sub-micron to some hundreds of microns. However, most of the sub-patterns are extremely repetitive and contain a limited number of line segment angles. The inventor has recognized that regions on a wafer can be considered to fall into two broad categories.

A first category includes areas that contain film structures which consist of only planar layers. These regions typically are the scribe alleys between dies and the areas between blocks of sub-micron features. Areas free of circuit structures may also occur during each step of the die fabrication process. The measurement of this type of region can be accomplished using multispectral reflectometry combined with a search of pre-computed libraries, as disclosed in the above-mentioned commonly assigned U.S. Pat. Nos. 5,291,269, 5,293,214 and 5,333,049, which are each incorporated by reference herein in their entireties.

A second category of wafer regions contain circuit details, such as sub-micron integrated circuit structures, metal traces, die lines, capacitors, and also local defects caused by processing. This second category of wafer regions is more difficult to characterize because the combination of one or more thin film layers, that are coherently coupled to such microscopic patterns, alters the phase and amplitude of the reflected light. In addition, these spatial variations tend to scatter and diffract light in non-specular directions. Numerical libraries pre-computed for this type of region require a knowledge of the material optical properties, as well as a knowledge of the mask patterns used at each stage of manufacture.

As employed herein the term 'coherent coupling' has the following meaning. If two optical surfaces have intensity transmissions of T1 and T2, then the combined transmission is simply T1 times T2. However, if the surfaces are coherently coupled together, then the resultant transmission is no longer the simple product, but depends instead on the amplitude and the phase of the transmission coefficient at each surface, as well as on the distance between the two surfaces.

A basic principle of this invention is illustrated in the optical system 10 shown in FIG. 1, where a surface 12 to be measured is viewed at normal incidence using an optical system 14 having a large F/number. As a result, the only light which can reach a multi-pixel CCD camera 16 is that which leaves the surface 12 within a few degrees of the optical axis 14a of the optical system 14, that is, light having angles within an acceptance cone of the optical system 14. It is noted that non-normal incidence can also be employed, providing that the image plane of the camera 16 is tilted and the illumination sources are correctly positioned.

The optical system 14 is preferably a full aperture telecentric system having a narrow cone of acceptance angles. Referring briefly to FIG. 10a there is illustrated a conventional imaging system used with a camera focal plane. A lens is disposed above a surface to be imaged at the camera focal plane. In the conventional imaging system the central rays (CR) are not perpendicular to the surface being imaged. As a result, different points in the field of view (FOV) of the camera are not imaged in the same manner. The conventional imaging system is characterized by a working distance (WD) measured in millimeters, a FOV (F/1) that is measured in tens of degrees, and a depth of field measured in microns.

In contradistinction, and referring to FIG. 10b, a telecentric imaging system is characterized by two lenses (L1 and L2), and an aperture (AP) that is located one focal length from L2. In the telecentric system the chief central rays (CR) are all parallel and perpendicular to the surface being imaged. The telecentric imaging system is characterized by a working distance (WD) measured in centimeters, a FOV that of approximately one degree (i.e., a narrow cone of acceptance angles), and a depth of field measured in millimeters.

Referring again to FIG. 1, a white (broadband) light source 18 and condensing lens 20 provide illumination of the surface 12 under test. If the surface 12 under test is illuminated with light incident at an angle greater than half the acceptance angle of the optical system 14, and if the surface 12 contains only planar layers, then none of the specularly reflected light enters the optical system and the image intensity corresponds to the black level of the CCD camera 16. That is, no image is detected. This specularly reflected light is indicated generally as 18a.

If, on the other hand, the surface 12 being viewed contains micron and sub-micron sized patterns of any type, then some light (designated as 18b) will be deviated by diffraction and scattering into the narrow acceptance cone of the optical system 14 and, hence, to the camera 16. The resulting detected pixel image thus includes bright areas corresponding to scattering and diffracting features, such as edges, that are embedded in the patterned regions.

In practice the optical system 14 shown in FIG. 1 also includes an on-axis filtered light source 22 and a beamsplitter (not shown in FIG. 1) placed between the surface 12 under test and the camera 16. This permits the recording and digitization of multispectral images which are used to measure the optical spectra at each pixel location, as is described in detail below.

Diffraction occurs when light illuminates a surface where the complex refractive index changes abruptly over the surface. The amount of light diffracted in an optical system is approximately proportional to the total length of an illuminated edge, multiplied by both the wavelength of the light and the intensity of the light beam (watts/cm). In conventional optical systems this is typically an extremely small amount since only a few apertures are illuminated. The opposite is true, however, in the case of patterned wafers, where the total length of the lines (corresponding to circuit features) which can diffract light is enormous. The large number of edge features results in large amounts of incident light being redirected in non-specular directions.

If images of the patterned wafer surface are recorded while being illuminated from at least one, and preferably two or more different directions using at least one and possibly a large range of incident angles, wavelengths and polarizations, then a mask can be created from these digitized images. The mask is then used to differentiate those regions of the wafer surface that are free of scattering and diffracting features from those regions that are not. In accordance with this invention, the application of the mask identifies those regions where specular reflection can be used to detect the thickness of the planar layer(s), as in the aforementioned U.S. Pat. No. 5,333,049. In the simplest case the mask is a two state (binary) mask, but in general multiple (three or more) level masks can be obtained depending upon the optical effects to be masked.

In the case of the two state (i.e., binary) mask, thickness computations using spectral libraries precomputed for planar layers are only valid in those regions of the mask where the diffracted light level is zero, i.e., the black regions. Planar spectral libraries of a type employed in the above-mentioned U.S. Pat. Nos. 5,291,269, 5,293,214 and 5,333,049, which have been incorporated by reference herein in their entireties, are not in general valid in the bright regions since the spectral signature of such regions is strongly influenced by the diffractive losses.

In consequence, a simple image mask, for example a binary mask, is used to reduce the number of points to be computed in order to determine a thickness profile of at least one layer, such as a CMP layer 12a, that overlies a patterned surface of a wafer 13. This results in increased processing speed and a reduction in errors in the resultant thickness map(s), since the diffracting areas are automatically screened out and eliminated from the film thickness determination.

Reference is now made to FIG. 11a for showing in greater detail one presently preferred embodiment of this invention. A primary white light source (LS1) provides a beam to a condensing lens (L1) which focusses the beam onto a filter wheel 24 having a plurality of different filters 24a each of which passes a different wavelength. Filtered light emanating from the filter wheel 24 is collimated by a second lens (L2) and is directed to a 50/50 beamsplitter 26. Light reflecting from the beamsplitter 26 is directed along the optical axis 14a that is normal to the surface of the wafer 13. Light that is specularly reflected from the surface of the wafer 13 is collected by the telecentric optical system 14 and is focussed at the image plane of the CCD camera 16, as was described previously with regard to FIG. 10b. The output of the CCD camera 16 is provided to a conventional frame grabber 16a which stores, for each position of the filter wheel 24, the resulting image or light signature. A complete frame comprised of pixel intensity values is read out by a processor 28a which stores the frame in a memory 28b. The processor 28a controls the position of the filter wheel 24 so as to obtain N images of the wafer, wherein each image corresponds to illumination of the wafer with light of a predetermined wavelength as selected by the particular filter that is interposed in the path of the white light beam from source LS1. At least one predetermined spectral library is stored in memory 28c, which is subsequently accessed and compared to the stored pixel values in the memory 28b.

The spectral library 28c contains a description of a set of reflectance curves for a range of parameter values such as film thickness. For example, and referring to FIG. 4g, if there are two films or layers deposited onto a silicon wafer the films will have optical properties $(n_1 k_1 t_1)$ and $(n_2 k_2 t_2)$, where $t_1$ and $t_2$ are the thicknesses of films 1 and 2, respectively, $n_1$ and $n_2$ are the refractive indices of films 1 and 2, respectively, and $k_1$ and $k_2$ are the absorption constants of films 1 and 2, respectively. The substrate also has a refractive index $n_s$ and an absorption constant $k_s$. The index of refraction and absorption values are wavelength dependent, and are actually given by $n(\lambda)$, $k(\lambda)$ for all films and the substrate.

The reflectance (R) of light at wavelength $\lambda$ for film thicknesses $t_1$ and $t_2$ for the two materials can be written as:

$$R(\lambda_1 t_1 t_2) = F(\lambda, n_s(\lambda), k_s(\lambda), t_1, n_1(\lambda), k_1(\lambda), t_2, n_2(\lambda), k_2(\lambda)).$$

If it is desired to measure the second film thickness $t_2$, then a series of reflectances $R_1 \ldots R_m$ can be pre-computed at wavelengths $\lambda_1 \ldots \lambda_m$ for each value of the unknown thickness parameter $t_2$.

All these spectrum are sampled data sets containing values. The library 28c therefore contains all possible reflectance (or transmission) spectrum (or some normalized version thereof) which are expected during a single measurement.

When a wafer is measured there is obtained a set of reflectance values (P) for wavelengths $\lambda_1, \lambda_2 \ldots \lambda_m$. For those reflectance values at the same m wavelength in the library 28c, the processor 28a determines which spectral pattern in the library 28c most closely matches the measured reflectance value. The thickness associated with a selected spectral pattern is thus correlated with the thickness of the film being measured.

In the simplest calculation a merit function $M(t_2)$ is derived which is a least squares function formed from the measured spectrum and one of the library spectra:

$$M(t_2) = (P_1 - R_1(t_2))^2 + (P_2 - R_2(t_2))^2 + \ldots (P_m - R_m(t_2))^2$$

Clearly, if the measured reflectance values $P_1 \ldots P_m$ were all exactly the same as the precomputed reflectances $R_1(t_2) \ldots R_m(t_2)$ for some unknown $t_2$, then M will be zero and a perfect match will have been found. In practice, noise in the measurement system causes M to rarely equal zero. As a result, the goal is to determine a merit function $M(t_2)$ having a minimum value. This is accomplished by finding the sum in the foregoing equation for all values of $t_2$, and then choosing the $t_2$ value which gives the minimum merit function $M(t_2)$. The selected $t_2$ value is thus taken to be the thickness of the layer 2 in FIG. 4g.

Referring again to FIG. 11a, and in accordance with this invention, at least two additional light sources LS2 and LS3 are provided for illuminating the wafer at angles that are off of the optical axis (OA). The wafer images obtained with these two additional light sources are employed to detect those regions of the wafer surface that are subject to non-specular reflections, i.e., those regions having features that scatter and diffract the illumination. The scattering and diffracting images are also stored within the memory 28b, and are processed as described below to generate a binary mask defining those regions of the wafer wherein the data stored in the spectral library 28c may give incorrect thickness results.

The two oblique light sources L2 and L3 may be replaced by a single source that surrounds the wafer 13. Alternatively, and as is illustrated in FIG. 11b, the filter wheel 24 may have two positions 25a and 25b wherein a feature 25c, such as a centrally located opaque region, causes the incident light to be diffracted away from the axis normal to the surface of the filter wheel 24. This can be seen by contrasting the normal ray A with the diffracted ray B. The result is that the ray B will strike the surface of the wafer 13 at an angle that diverges from the optical axis 14a, which is the desired result. By providing two regions 25a and 25b that bend the light in two different directions, it is possible to illuminate the wafer 13 from two different directions, as will be described below with respect to FIGS. 4b, 4c and 4d. Representative dimensions for the regions 25a and 25b are a diameter of one inch, and a width of 0.75 inch for the centrally located opaque regions 25c.

Figure 2:
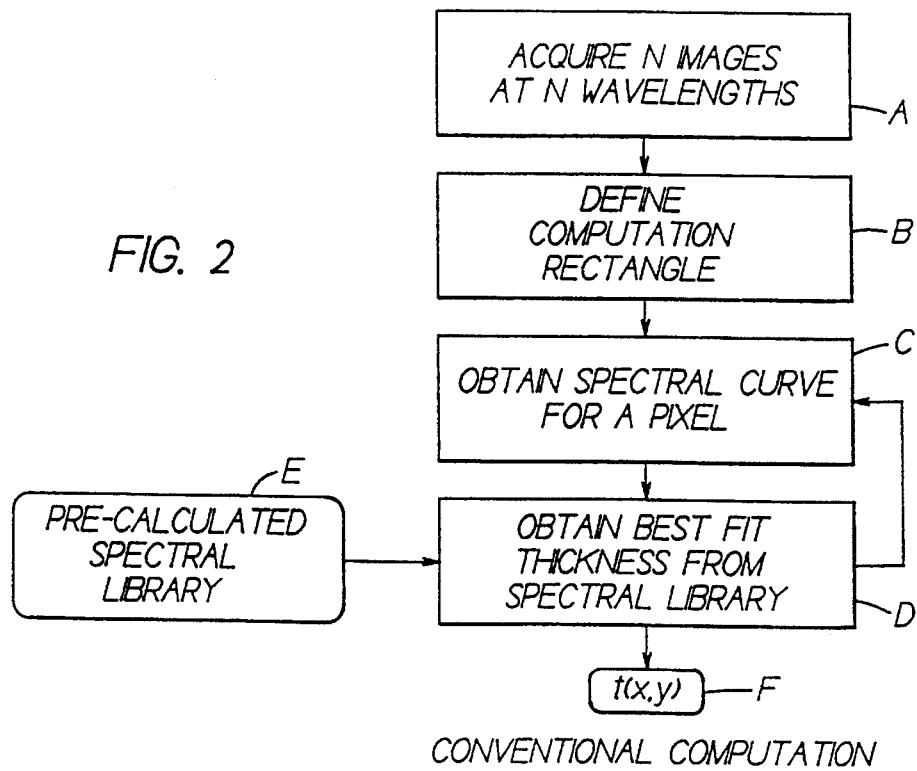
FIG. 2 illustrates process steps in accordance with a prior art method of measuring film thickness for a film disposed on a planar, unpatterned substrate.

FIG. 2 illustrates the computation flow for a conventional multi-spectral case. In Block A N images are acquired at N different wavelengths. In Block B a computation rectangle is defined from the N images. In Block C a spectral curve is obtained for each pixel within the computational rectangle. The spectral curve indicates the amount of light reaching the camera for each of the N wavelengths. At Block D a pre-calculated spectral library (Block E) is accessed to obtain a best fit film thickness. This is a recursive process, with control flowing back to Block C until a best fit curve is obtained for all pixels in the computational rectangle. At Block F a thickness (t) is output from the processor 28a for each (x,y) pixel position within the computational rectangle.

Figure 3:
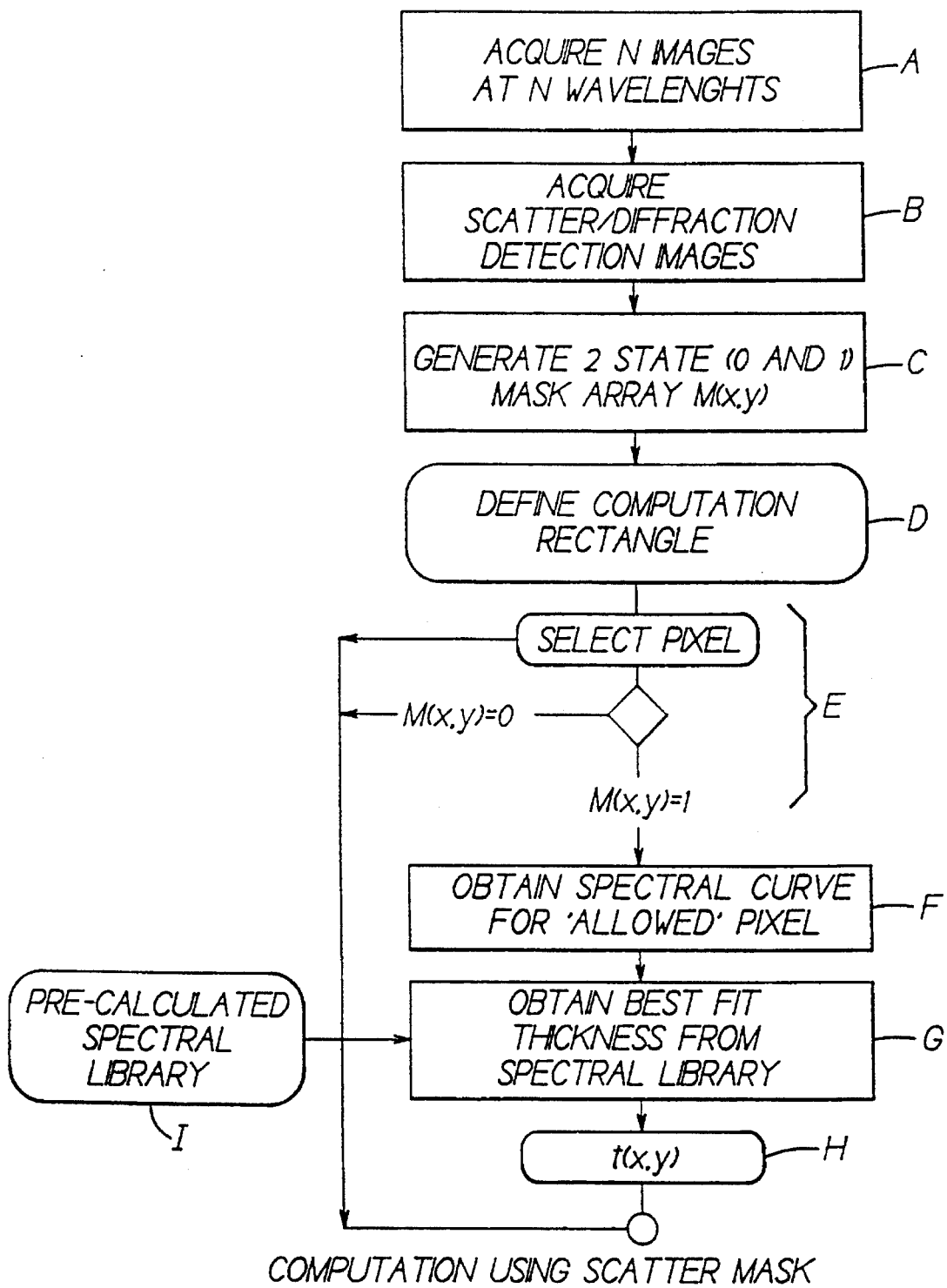
FIG. 3 illustrates process steps in accordance with this invention for measuring film thickness for a film disposed on a patterned substrate.

FIG. 3 illustrates the computation flow in accordance with this invention, wherein only pixels in mask-specified planar layer regions are processed. In Block A N images are acquired at N different wavelengths. In Block B at least two scatter/diffraction images are acquired. In Block C the processor 28a generates a binary mask based on the scatter/diffraction images that are acquired in Block B. In Block D a computation rectangle is defined based on the mask obtained in Block C. In Block E a determination is made, for each pixel in the computation rectangle, whether the merit function (M) is equal to zero or one. If M=0 the pixel is rejected, while if M=1 the pixel is selected and the method continues to Block F where a spectral curve is obtained for each selected pixel within the computational rectangle. As before, the spectral curve indicates the amount of light reaching the camera for each of the N wavelengths. At Block G a pre-calculated spectral library (Block I) is accessed to obtain a best fit film thickness. At Block F a thickness (t) is output for each (x,y) selected pixel position within the computational rectangle. In accordance with this invention the selected pixels are those that correspond to a planar layer region of the surface under test that is free of underlying scattering and diffracting features.

FIGS. 4a–4e illustrate the principle of the mask generation method for a patterned wafer which has been coated with at least one layer of silicon dioxide ($SiO_2$) as part of a planarization process. The images shown in FIGS. 4a–4e are approximately ⅛th of the total image collected by the frame grabber 16a that is associated with the CCD camera 16 of FIG. 1.

It can be seen that the substantially monochromatic image (one of many taken during a measurement) shown in FIG. 4a does not provide any indication concerning which areas of the wafer contain scattering/diffracting regions and which areas contain only planar (spectrally reflecting) layers. The images shown in FIGS. 4b and 4c are scatter images taken using the off-axis light source 18 at two different illumination directions (front and side). Essentially these two images are "dark field" images which are combined, pixel-by-pixel, to form a composite scattering and diffracting image that is shown in FIG. 4d. The two scatter images in this case were taken with the light sources 18 in approximately orthogonal directions. This is evident from the different orientations of the line pair images on the left side of the images in FIGS. 4b and 4c.

Figure 4F:
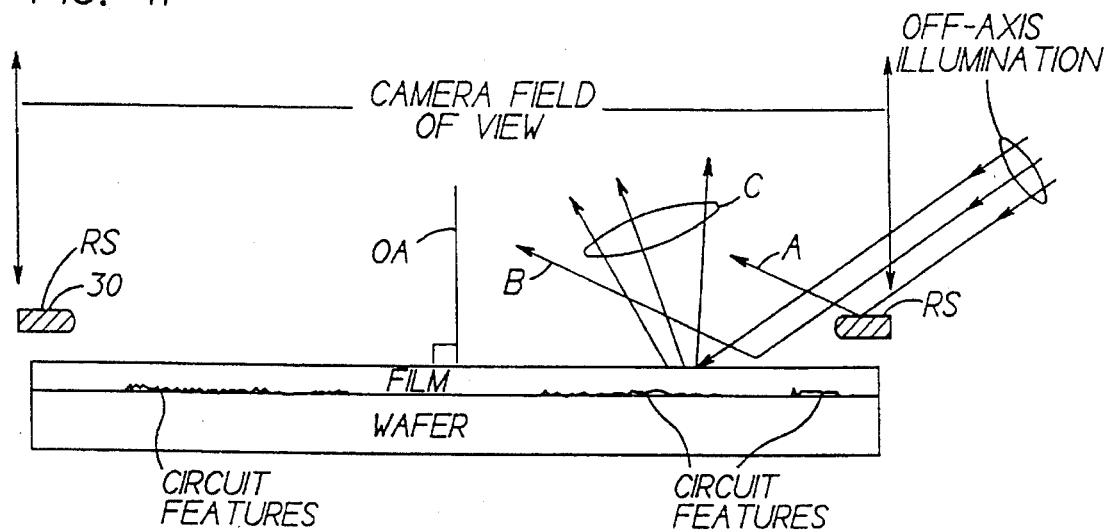
FIG. 4f is an enlarged cross-sectional view, not to scale, that illustrates the use of a planar reference surface within the field of view of the camera of FIG. 1.
Figure 4G:
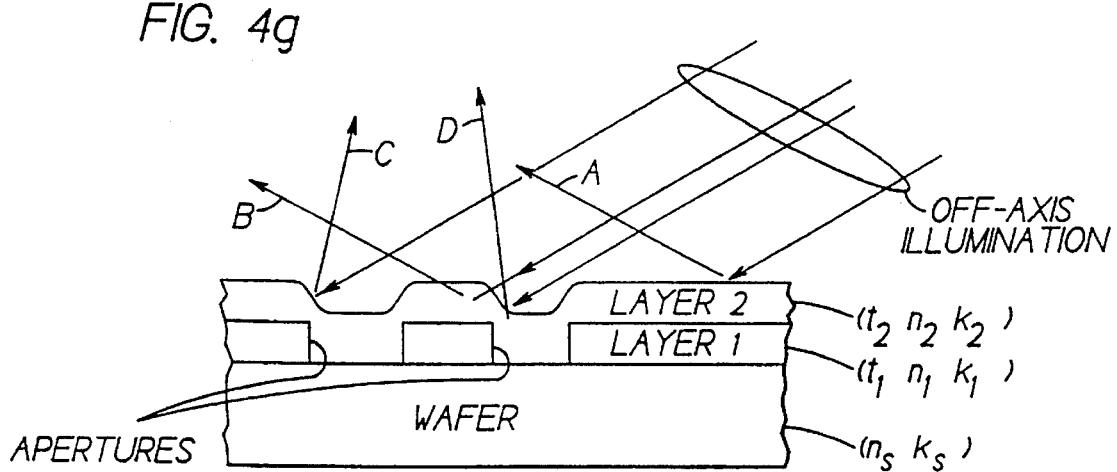
FIG. 4g is an enlarged cross-sectional view that illustrates a portion of a wafer and two $SiO_2$ films.

Referring to FIG. 4g, these line pair images correspond to the horizontal and vertical edges of square apertures that were etched into a $SiO_2$ CMP layer before the entire wafer was coated with a second layer of $SiO_2$. Off-axis illumination that strikes the edges is scattered and diffracted into the acceptance cone of the optical system 14, indicated by rays C and D, and are detected by the camera 16. Those rays that strike only planar film regions, without underlying substrate circuit features, are specularly reflected (rays A and B), and do not enter the acceptance cone of the optical system 14. That is, for the specularly reflected rays A and B the angle of reflection is approximately equal to the angle of incidence, and the angle of incidence is predetermined so that the reflected rays do not enter the acceptance cone of the optical system 14. By example, if the acceptance cone of the imaging system 14 includes only rays that diverge by up to 1° from the optical axis, then an angle of incidence that is 2° from the optical axis (or 88° with respect to the surface of the wafer) is sufficient to insure that any specularly reflected rays will not reach the focal plane of the CCD camera 16.

As a result, the edges associated with rays C and D contribute to the formation of 'bright' areas in the CCD camera image, while the planar regions associated with rays A and B do not contribute to the image and are thus "dark".

The line pairs of FIGS. 4b and 4c combine to outline the inverted islands in the composite image of FIG. 4d, which also indicates, by the presence of the dark central region, that there are no circuit details inside these squares.

In general, this technique can employ a single source that is moved relative to the wafer, or can use multiple sources disposed at different locations, or can employ a ring or annular source that simultaneously applies off-axis illumination from all directions relative to the wafer. The source or sources may provide various wavelengths, polarizations and incidence angles to enhance the light signature recording process, and may be used to code various image regions on the wafer surface. By example, and referring to FIG. 1, a polarizer plate 19 can be interposed within the beam of the off-axis light source 18. By rotating the polarizer plate 19 various polarization states can be introduced into the off axis beam.

As is seen in the detail of FIG. 4f, the camera field of view also contains a planar silicon reflecting surface 30 which provides a "black level." planar reference surface. This silicon structure may be thought of as a 'picture frame' that surrounds the image of the silicon wafer. The off-axis illumination that strikes the reference surface (RS) experiences specular reflection (ray A), just as does the ray B that strikes an unpatterned region of the silicon wafer, and is thus not detected by the camera 16. In contradistinction, the off-axis illumination that strikes a patterned region of the wafer experiences scattering and diffraction (rays C), and a portion of the scattered and diffracted illumination is detectable by the camera 18. The Si reference surface RS can be seen in the left-most region in all the images shown in FIGS. 4a–4e.

In accordance with an aspect of this invention the electronic intensity level in the area corresponding to the reference surface RS is used to determine a level at which to threshold the images of FIGS. 4b and 4c, i.e., any pixels above the silicon reference level are set to 0.0 (black) and those below the silicon reference level are set to 1.0 (white). This thresholding of the image generates the binary mask 32 that is illustrated in FIG. 4e. In FIG. 4e those areas that appear black contain scattering and diffracting features, while those areas that appear white are free of such features, and are associated only with planar film systems wherein accurate film thickness determinations can be made using pre-computed library functions. In some cases the edges of the resulting mask may be irregular. However, the irregularities can be removed by the use of known image processing techniques, such as filters, to remove isolated pixels.

The collection of the images of FIGS. 4b and 4c is preferably made during the acquisition of all the multispectral images, but before any thickness calculations are performed.

It should be noted that the technique described thus far does not require any special wafer positioning or rotational alignment, other than that required to determine where the map is being measured for archival purposes.

An examination of the various regions of the wafer image shown in FIG. 4a with a high power microscope capable of resolving submicron lines revealed that all of the areas which show scatter and diffraction contain circuit features. Most of the rectangular regions contain vertical line patterns. The empty rectangles on the left side (see FIG. 4g) do not contain features, and so with the exception of the surrounding edge regions, these squares contain only planar films as indicated by the corresponding bright portions of the mask of FIG. 4e.

Figure 5A:
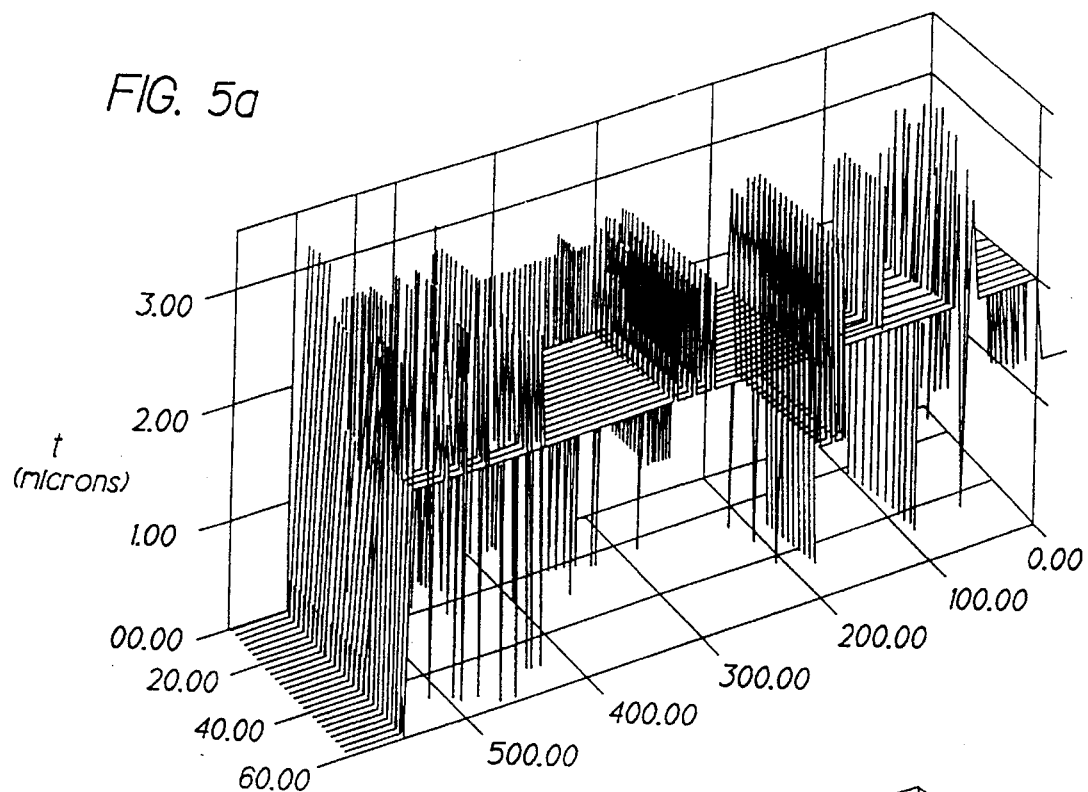
FIG. 5a illustrates a thickness map for a portion of a $SiO_2$ layer on a patterned substrate without the use of the mask generated in accordance with this invention.
Figure 5B:
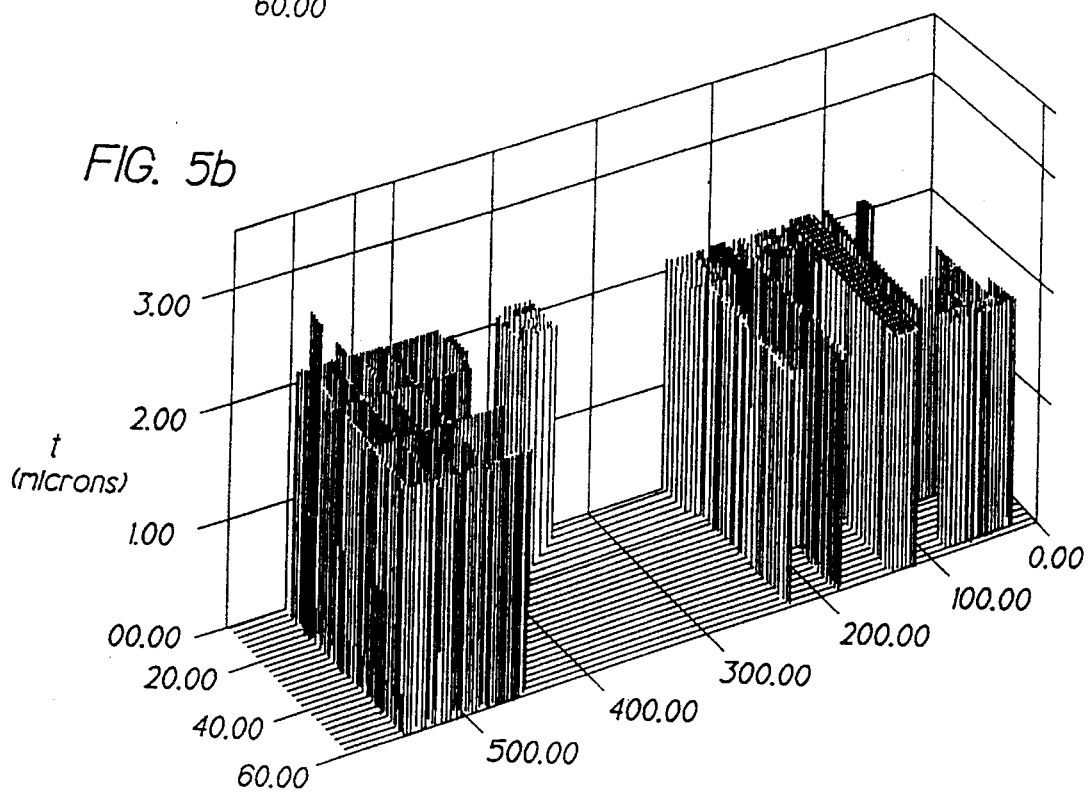
FIG. 5b illustrates a thickness map for the portion of the $SiO_2$ layer on the patterned substrate with the use of the mask generated in accordance with this invention.

Thickness maps were generated for the entire 600×64 pixel image of FIG. 4a using a numerical spectral library 28a which contained spectra of a single $SiO_2$ layer (0 to 4.0 microns) on silicon, since it was known that the wafer had been coated with such a layer. FIGS. 5a and 5b show a comparison of the thickness maps (32×300 points) obtained both with (FIG. 5a) and without. (FIG. 5b) the use of the mask of FIG. 4e. In this case thicknesses were determined for each of the 38,400 pixels and the mask was then used as a multiplier. It can be seen that the unmasked map of FIG. 5a contains numerous incorrect values, some of which are due to the edge of the silicon reference surface RS, but most of which are due to scattering and diffraction effects from the patterned wafer surface. The masked map of FIG. 5b contains far fewer points, since the area under consideration includes large areas containing circuit details which were excluded from the thickness determination.

Figure 6A:
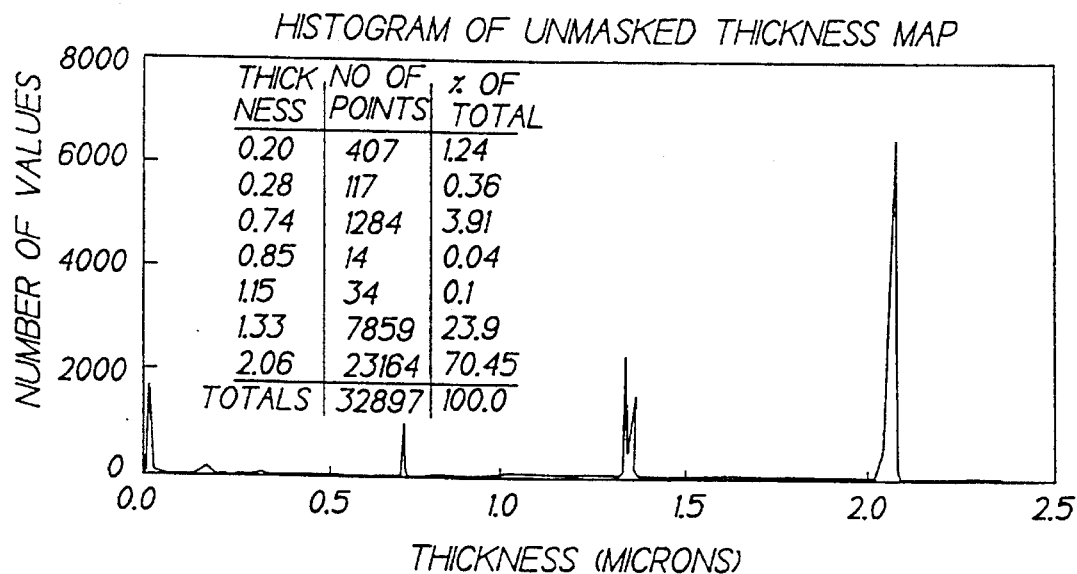
Figure 6B:
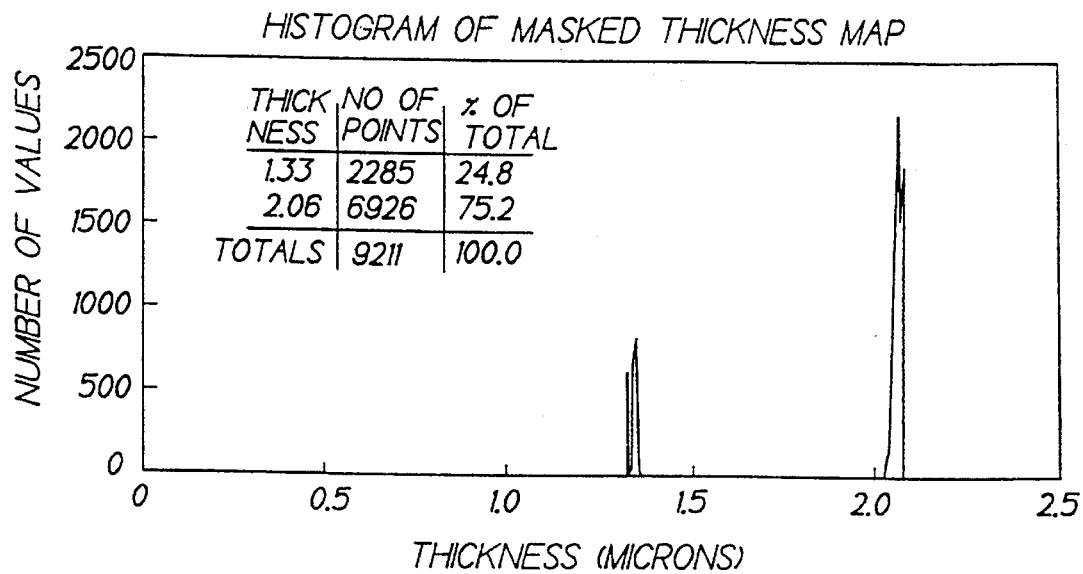
FIG. 6b is a histogram corresponding to the masked thickness map of FIG. 5b.

However, the thickness values of FIG. 5b can be shown to fall into two main bands, as is indicated when contrasting the histogram of FIG. 6a with that of FIG. 6b. In the unmasked case of FIG. 6a, 5% to 6% of the pixels give an incorrect answer, whereas the use of the mask 32 of FIG. 4e reduces the number of incorrect pixel values to less than 0.1%. The width of the histogram peaks also indicates the degree of film thickness uniformity over the field of view that was used (5 mm×0.5 mm).

Figure 7A:
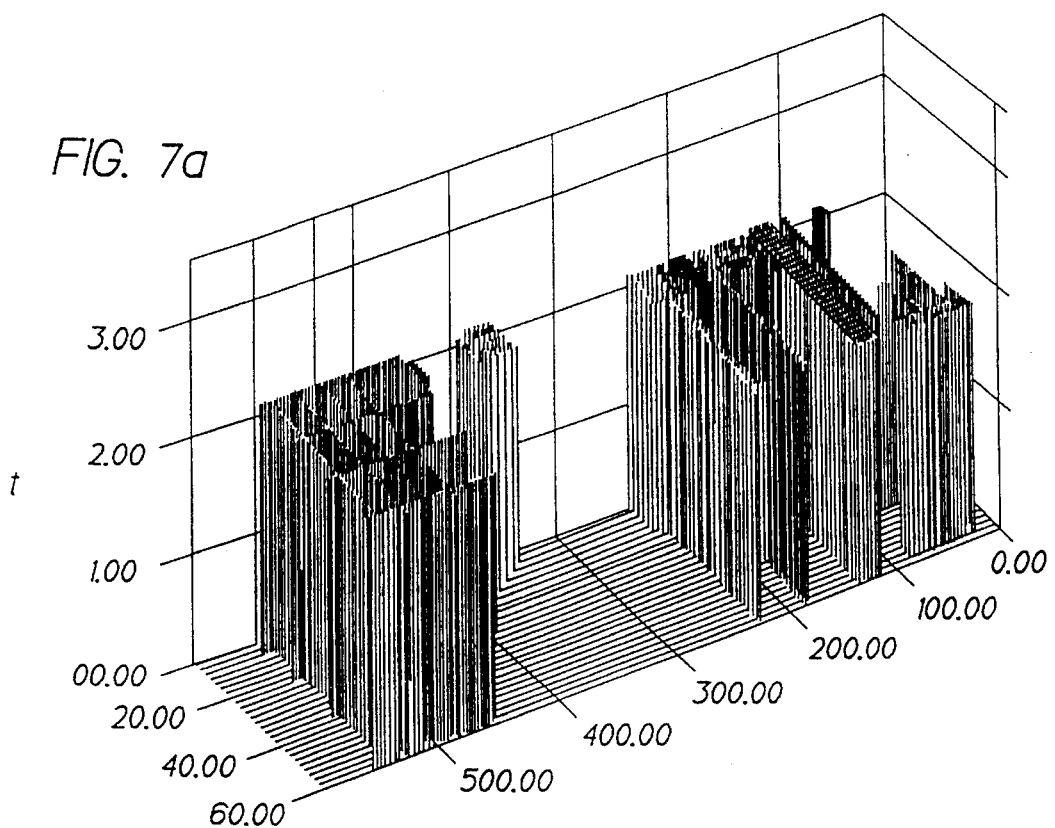
FIG. 7a is an exemplary 2.06 micron layer thickness map obtained by masking and thresholding in accordance with this invention.
Figure 7B:
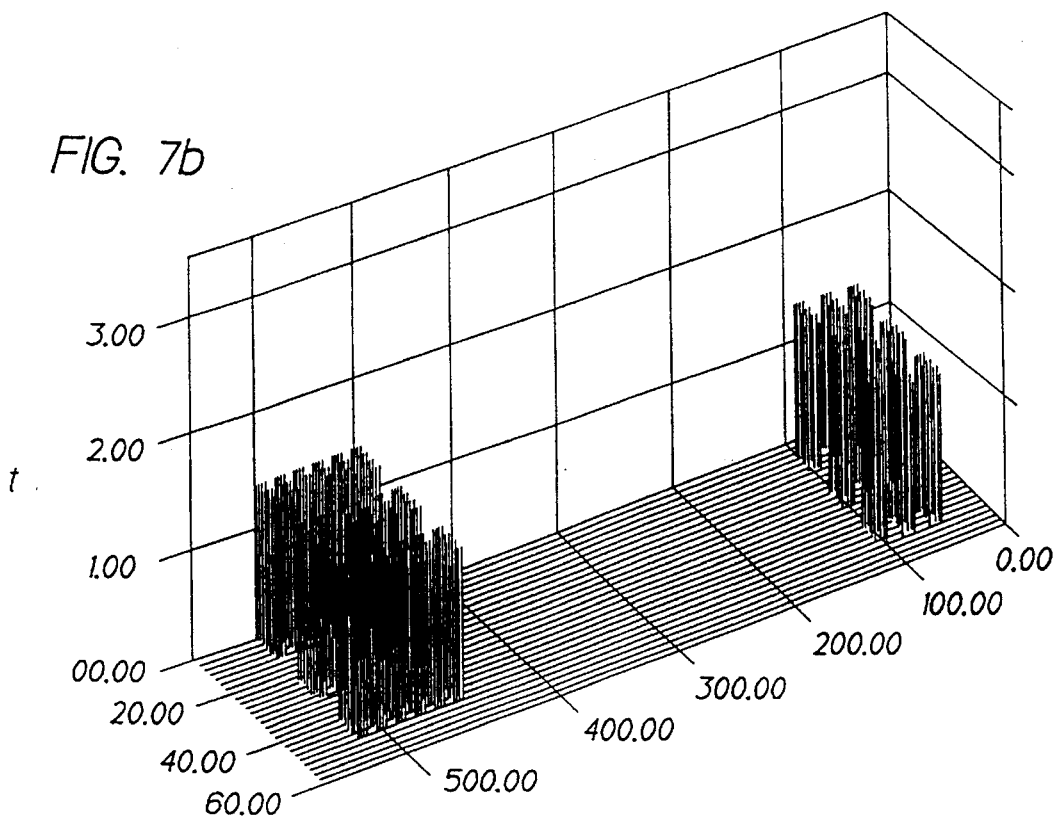
FIG. 7b is an exemplary 1.33 micron layer thickness map obtained by masking and thresholding in accordance with this invention.

It is apparent from the histogram data that two film thickness values are predominant, but these values are difficult to discern from a three dimensional plot. FIGS. 7a and 7b show these two major components of the masked thickness map obtained by thresholding the data into two ranges (0.0 to 1.9 microns) and (1.9 to 2.5 microns), and further illustrate the clarity that is introduced when the masking technique is used. In FIG. 7a the rectangularly shaped regions on the left correspond to the top of the apertures shown in FIG. 4g, while in FIG. 7b the rectangularly shaped regions on the left correspond to the film layer within the bottom of each of the apertures in FIG. 4g.

Although the masking technique does effectively catalog the patterned wafer surface into planar and diffracting regions, it is still possible for there to be several different thin film stacks present within a given area of a wafer. If it is assumed that the two different film thicknesses indicated by the measurement described earlier were actually caused by depositing a film of $SiO_2$ onto two structures, in one case bare silicon and the other case a titanium nitride film on bare silicon, then the thickness determining algorithm would have computed thickness values for both sets of pixels, one set correct, the other incorrect. Fortunately, in cases like this the merit function, which describes the goodness of the fit, and which is automatically calculated during the thickness determination, is very useful in discriminating against different film stack designs. That is, different film systems over different regions exhibit merit functions having different average values over the different thin film systems. The correct thicknesses correspond to the lowest average merit function since a "perfect fit" would give zero merit function values.

Figure 8A:
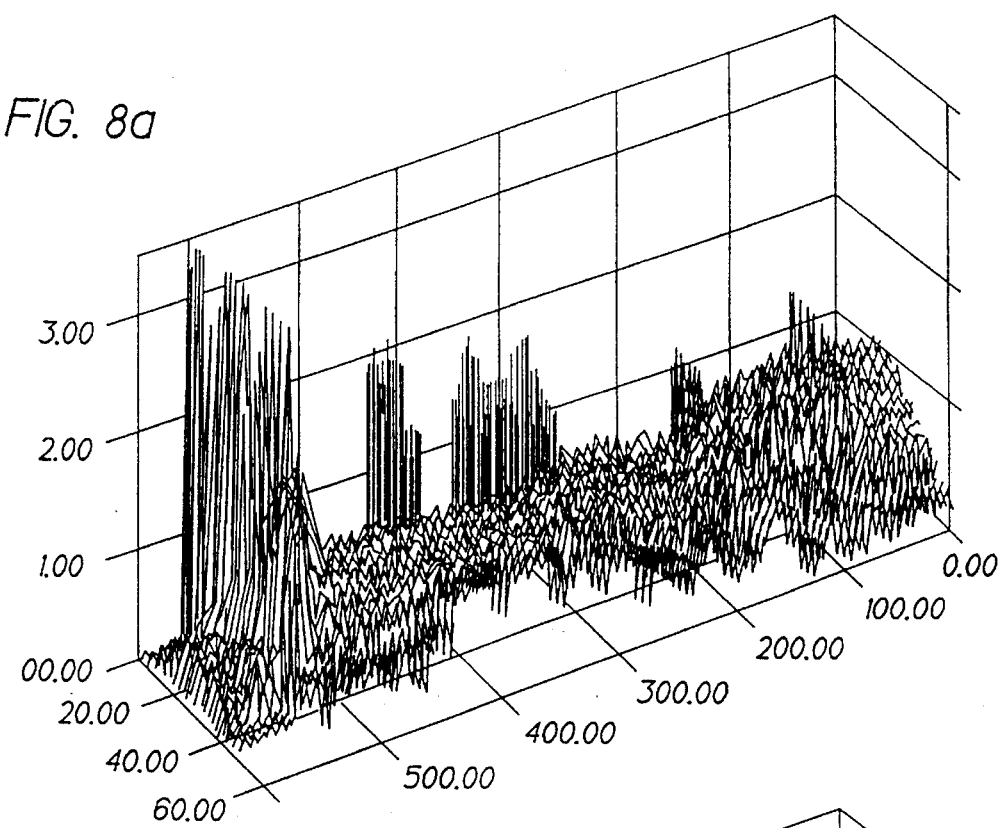
Figure 8B:
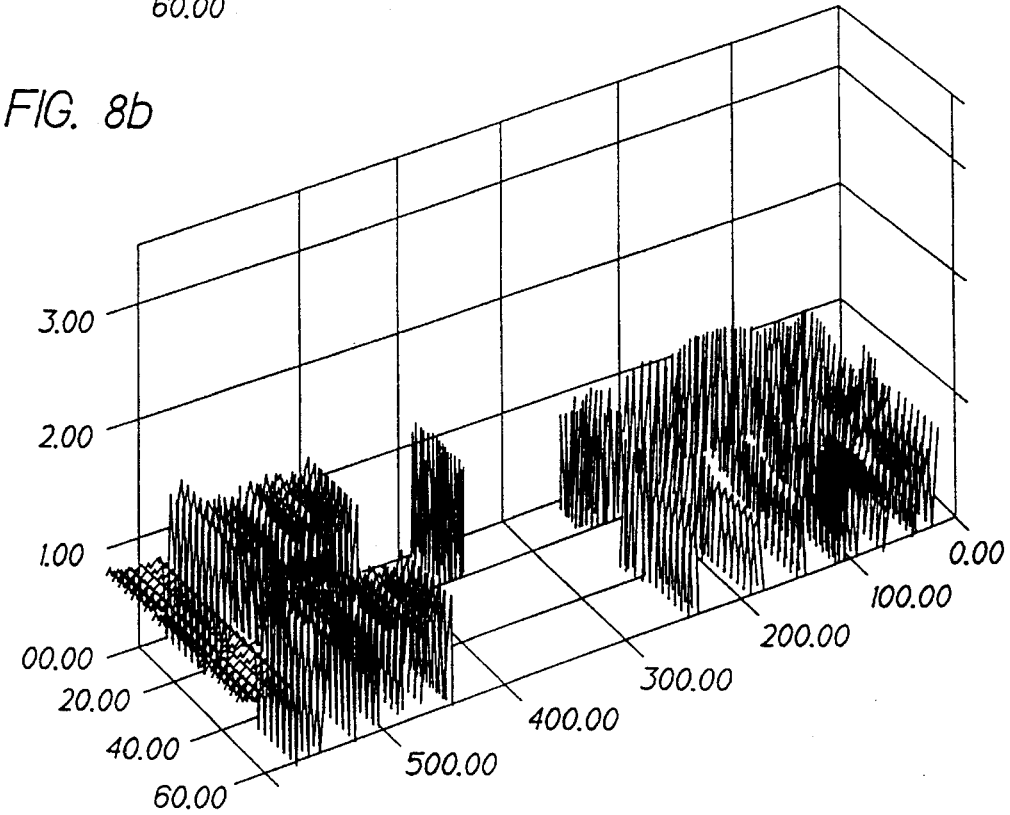
FIG. 8b is a merit function map corresponding to the masked thickness map of FIG. 5b.

The merit function maps corresponding to the measurement previously described are shown in FIGS. 8a and 8b, where the vertical scale is in percent representing the least squares difference in reflectance between the measured and pre-computed spectra over all the wavelengths used in the measurement. FIG. 8a shows the unmasked merit map with values ranging up to 1% and clear shows the different average merit function values at different places on the wafer. In contrast, FIG. 8b shows the merit function only over the regions allowed by the mask, and clearly shows that the average values for the merit function are approximately the same over regions where the computed film thicknesses fall into two bands. This is a strong indication that the film materials and film stacks are identical, except for thickness variations in the two regions.

Figure 9:
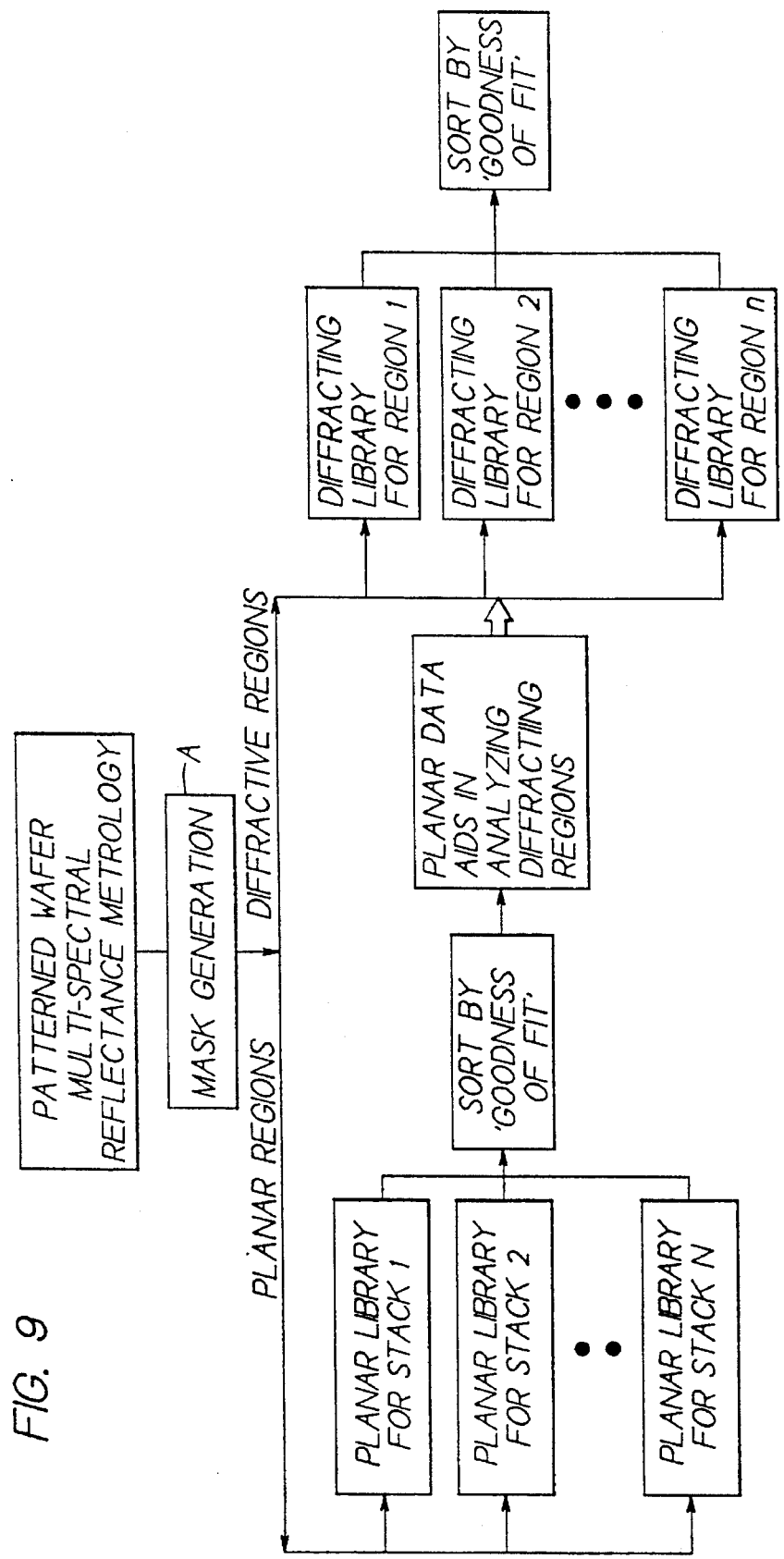
FIG. 9 is a logic flow diagram illustrating the use of a plurality of planar and diffracting libraries in accordance with an aspect of this invention.

Further in accordance with this invention a method for creating a catalog for the different regions expected to be found on a patterned wafer or, by example, an LCD flat screen display, is illustrated in FIG. 9. A main division between planar and scattering/diffracting regions is augmented by using goodness of fit maps to distinguish between different planar stacks or different pattern/film stack combinations. It should be noted that the two libraries (planar and diffracting) are not independent, and that the measurement data obtained from planar layer regions can also be used to complement analysis of the diffracting regions. The predominant errors in precomputing the numerical libraries for planar regions are caused by uncertainties in the optical constants for the different layers. Except for the well known list of certain materials, namely silicon, steam grown $SiO_2$, air and water, most materials used in semiconductor manufacture exhibit optical properties which depend upon the deposition process used.

Computing the numerical libraries for the various diffracting regions found on a wafer requires that the coherent coupling interactions between the patterned layers be included. This in turn requires a priori knowledge of the component shapes ("shapelets") of the pattern, since these tend to be repetitive and can be treated as arrays of shapelets in the calculations.

In FIG. 9, having established the mask for a given wafer or portion of a wafer as described above (Block A), those regions designated as planar regions are processed with the established planar libraries for the various types of film stacks, while those regions designated as diffracting (i.e., regions having circuit features) are processed with the established diffracting libraries for discrete patterned wafer regions. In this manner a thickness profile that incorporates both planar and patterned wafer regions is obtained.

The thickness measurements described herein are for what could be termed an uncooperative wafer, i.e., no prior knowledge was available as to the circuit patterns other than the fact that the entire surface had been coated with a planarizing layer of $SiO_2$. In practice prior knowledge of the various film structures and possibly the local geometric patterns of circuits structures can be accurately determined prior to making the thickness determination.

Although described in the context of presently preferred embodiments of this invention, it should be understood that a number of modifications can be made to these embodiments, and that these modifications will fall within the scope of the teaching of the invention. By example, if a GaAs wafer is being imaged it may be preferable to also employ GaAs as the reference surface (RS) material for the pixel thresholding operation. Also by example, the filter wheel 24 can be replaced with a moveable grating or a prism for providing illumination with multiple wavelengths.

Thus, while the invention has been particularly shown and described with respect to preferred embodiments thereof, it will be understood by those skilled in the art that changes in form and details may be made therein without departing from the scope and spirit of the invention.

What is claimed is:

1. A method for determining a thickness of a layer disposed over a surface of a substrate, comprising the steps of:

illuminating the layer with light having a first incidence angle;

obtaining at least one first image of the layer with light reflecting from the layer and the substrate;

illuminating the layer with light having a second incidence angle;

obtaining at least one second image of the layer with light reflecting from the layer and the substrate, the reflected light being primarily due to a presence of features that at least one of scatter and diffract the light having the second incidence angle;

identifying from the at least one second image at least one region not having the features; and determining, in accordance with the at least one first image, a thickness of the layer within the at least one identified region not having the features.

2. A method as set forth in claim 1 wherein the first incidence angle is an angle that causes a specularly reflected light ray to enter an acceptance cone of an optical system used to obtain the first image, and wherein the second incidence angle is an angle that causes a specularly reflected light ray to not enter the acceptance cone of the optical system used to obtain the second image.

3. A method as set forth in claim 1 wherein the step of illuminating the layer with light having a first incidence angle sequentially illuminates the layer with light having different predetermined wavelengths, and wherein the step of obtaining at least one first image of the layer obtains a plurality of first images, individual ones of the plurality of first images being obtained with light having one of the predetermined wavelengths.

4. A method as set forth in claim 3 wherein the step of determining includes the steps of:

for each of the plurality of first images, comparing image pixel values corresponding to the at least one identified region with individual ones of a plurality of sets of predetermined image pixel values, each of the plurality of sets corresponding to a different layer thickness; and selecting as a layer thickness value a thickness associated with a set that gives a best match with the image pixel values.

5. Apparatus for detecting a thickness of at least one layer disposed over a surface of a wafer having at least one first wafer region characterized by circuit and other features and at least one second wafer region characterized by an absence of circuit and other features, comprising:

an optical system for collecting light reflecting from said at least one layer and said surface of said wafer, said optical system having an optical axis and a cone of acceptance angles disposed about said optical axis;

a camera coupled to said optical system for obtaining an image from the collected light;

a first light source for illuminating said layer with light that is directed along said optical axis and within said cone of acceptance angles;

at least one second light source for illuminating said layer with light that is directed off said optical axis and outside of said cone of acceptance angles; and a data processor having an input coupled to an output of said camera for obtaining from said camera first pixel data corresponding to at least one first image obtained with light from said first light source and for obtaining second pixel data corresponding to at least one second image obtained with light from said at least one second light source, said data processor including means for generating an image mask from said second pixel data for distinguishing said at least one first wafer region from said at least one second wafer region, and further including means for detecting a thickness of said at least one layer within said at least one second wafer region in accordance with said first pixel data and in accordance with predetermined pixel reference data that is representative of a plurality of different layer thicknesses.

6. Apparatus as set forth in claim 5 wherein said optical system is comprised of a telecentric optical system.

7. Apparatus as set forth in claim 5 wherein said first light source provides illumination with a first incidence angle on said layer, the first incidence angle being an angle that causes a specularly reflected light ray to enter said cone of acceptance angles of said optical system, and wherein said second light source provides illumination with a second incidence angle on said layer, the second incidence angle being an angle that causes a specularly reflected light ray to not enter said cone of acceptance angles of said optical system.

8. Apparatus as set forth in claim 5 wherein said first light source includes means for sequentially illuminating said layer with light having different predetermined wavelengths; wherein said camera obtains a plurality of first images, individual ones of the plurality of first images being obtained with light having one of the predetermined wavelengths; wherein said data processor includes means, responsive to each of said plurality of first images, for comparing associated first pixel data values corresponding to said at least one second region with individual ones of a plurality of sets of predetermined image pixel values, each of the plurality of sets corresponding to a different layer thickness; and said data processor further includes means for selecting as a layer thickness value a thickness associated with a set that gives a best match with the first pixel data values.

9. Apparatus as set forth in claim 5 wherein said at least one second light source is comprised of first and second light sources that are disposed for illumination said layer from two different directions.

10. Apparatus as set forth in claim 5 wherein said at least one second light source is comprised of an annular light source that surrounds said wafer.

11. Apparatus as set forth in claim 5 and further comprising means for varying a polarization state of said second light source.

12. Apparatus as set forth in claim 5 and further comprising a reference surface that is disposed within a field of view of said camera, said reference surface being oriented with respect to said surface of said wafer for specularly reflecting light from said second light source, and wherein said image mask generating means is responsive to second pixel data corresponding to an image of said reference surface for thresholding said second pixel data into at least one first image mask region corresponding to said at least one first wafer region and into at least one second image mask region corresponding to said at least one second wafer region.

13. Apparatus as set forth in claim 5 wherein said first light source and said at least one second light source are each a portion of a filter wheel assembly having a plurality of selectable positions, wherein at least one selectable position results in illuminating said layer with light that is directed along said optical axis and that is within a predetermined range of wavelengths, and wherein at least one other selectable position results in illuminating said layer with light that is directed off of said optical axis.

14. Apparatus for detecting a thickness of at least one layer disposed over a surface of a wafer having at least one first wafer region characterized by circuit and other features and at least one second wafer region characterized by an absence of circuit and other features, comprising:

an optical system for collecting light reflecting from said at least one layer and said surface of said wafer, said optical system having an optical axis and a cone of acceptance angles disposed about said optical axis;

a camera coupled to said optical system for obtaining an image from the collected light;

a first light source for illuminating said layer with light that is directed along said optical axis and within said cone of acceptance angles;

at least one second light source for illuminating said layer with light that is directed off said optical axis and outside of said cone of acceptance angles; and a data processor having an input coupled to an output of said camera for obtaining from said camera first pixel data corresponding to at least one first image obtained with light from said first light source and for obtaining second pixel data corresponding to at least one second image obtained with light from said at least one second light source, said data processor including means for generating an image mask from said second pixel data for distinguishing said at least one first wafer region from said at least one second wafer region, and further including means for detecting a thickness of said at least one layer within said at least one first wafer region in accordance with said first pixel data and in accordance with first predetermined pixel reference data that is representative of a plurality of different layer thicknesses, and for detecting a thickness of said at least one layer within said at least one second wafer region in accordance with said first pixel data and in accordance with second predetermined pixel reference data that is representative of a plurality of different layer thicknesses.

15. Apparatus as set forth in claim 14 wherein said optical system is comprised of a telecentric optical system.

16. Apparatus as set forth in claim 14 wherein said first light source provides illumination with a first incidence angle on said layer, the first incidence angle being an angle that causes a specularly reflected light ray to enter said cone of acceptance angles of said optical system, and wherein said at least one second light source provides illumination with a second incidence angle on said layer, the second incidence angle being an angle that causes a specularly reflected light ray to not enter said cone of acceptance angles of said optical system.

17. Apparatus as set forth in claim 14 wherein said first light source includes means for sequentially illuminating said layer with light having different predetermined wavelengths; wherein said camera obtains a plurality of first images, individual ones of the plurality of first images being obtained with light having one of the predetermined wavelengths; wherein said data processor includes means, responsive to each of said plurality of first images, for comparing associated first pixel data values corresponding to said at least one second wafer region with individual ones of a plurality of sets of predetermined image pixel values, each of the plurality of sets corresponding to a different layer thickness; and said data processor further includes means for selecting as a layer thickness value a thickness associated with a set that gives a best match with the first pixel data values.

18. Apparatus as set forth in claim 14 and further comprising a reference surface that is disposed within a field of view of said camera, said reference surface being oriented with respect to said surface of said wafer for specularly reflecting light from said second light source, and wherein said image mask generating means is responsive to second pixel data corresponding to an image of said reference surface for thresholding said second pixel data into at least one first image mask region corresponding to said at least one first wafer region and into at least one second image mask region corresponding to said at least one second wafer region.

19. A method for measuring a thickness profile of at least one layer disposed over a surface of a semiconductor wafer having at least one patterned wafer surface region, comprising the steps of:

illuminating the at least one layer with light that impinges on the at least one layer with a non-normal angle of incidence and imaging first light reflecting from the at least one layer and from the surface of the semiconductor wafer;

illuminating the at least one layer with light that impinges on the at least one layer with a normal angle of incidence and imaging second light reflecting from the at least one layer and from the surface of the semiconductor wafer;

analyzing an image obtained from the first reflected light to distinguish the at least one patterned wafer surface region from at least one non-patterned other wafer surface region; and determining, at least within the distinguished at least one other wafer surface region, a thickness profile of the at least one layer using an image obtained with the second reflected light.

20. A method as set forth in claim 19 wherein the steps of illuminating also illuminate a reference surface that is disposed in proximity to the surface of the wafer, and wherein the step of analyzing uses an image obtained with light reflecting from the reference surface to threshold the image obtained with the first reflected light.

21. A method as set forth in claim 19 wherein the step of illuminating the at least one layer with light that impinges on the at least one layer with a normal angle of incidence includes the steps of sequentially illuminating the at least one layer with light having different wavelengths, and obtaining an image with first light reflecting from the at least one layer and from the surface of the semiconductor wafer at each of the different wavelengths.

\* \* \* \* \*

UNITED STATES PATENT AND TRADEMARK OFFICE
CERTIFICATE OF CORRECTION

PATENT NO. : 5,555,474
DATED : September 10, 1996
INVENTOR(S) : Anthony M. Ledger It is certified that error appears in the above-identified patent and that said Letters Patent is hereby corrected as shown below:

Column 7, line 39, "FIG. 10b" should be --FIG. 1--.

Column 8, line 49, "L2 and L3" should be --LS2 and LS3--.

Column 9, line 29, "Block F" should be --Block H--.

Column 11, line 15, "28a" should be --28c--.

Column 12, line 10, "clear" should be --clearly--.

Signed and Sealed this

Twenty-eighth Day of April, 1998

Attest:

BRUCE LEHMAN

*Attesting Officer*  *Commissioner of Patents and Trademarks*